United States Patent
Susarla et al.

(10) Patent No.: US 9,832,270 B2
(45) Date of Patent: Nov. 28, 2017

(54) DETERMINING I/O PERFORMANCE HEADROOM

(71) Applicant: NetApp, Inc., Sunnyvale, CA (US)

(72) Inventors: Sai Rama Krishna Susarla, Bangalore (IN); Charles D. Binford, Wichita, KS (US); Vishal Kumawat, Tamil Nadu (IN)

(73) Assignee: NetApp, Inc., Sunnyvale, CA (US)

( * ) Notice: Subject to any disclaimer, the term of this patent is extended or adjusted under 35 U.S.C. 154(b) by 430 days.

(21) Appl. No.: 14/538,314

(22) Filed: Nov. 11, 2014

(65) Prior Publication Data

US 2016/0134493 A1   May 12, 2016

(51) Int. Cl.
    *G06F 15/16*   (2006.01)
    *H04L 29/08*   (2006.01)
    *G06F 3/06*    (2006.01)

(52) U.S. Cl.
    CPC ............ *H04L 67/1097* (2013.01); *G06F 3/06* (2013.01)

(58) Field of Classification Search
    CPC ........................................................ H04L 43/04
    USPC ........................................................ 709/224
    See application file for complete search history.

(56) References Cited

U.S. PATENT DOCUMENTS

| | | | |
|---|---|---|---|
| 7,599,293 B1* | 10/2009 | Bain ................... | H04L 12/2602 370/235 |
| 2008/0082844 A1* | 4/2008 | Ghiasi .................. | G06F 1/3203 713/323 |
| 2009/0106008 A1* | 4/2009 | Branson ................ | G06F 9/5066 703/13 |
| 2013/0312005 A1* | 11/2013 | Chiu ....................... | G06F 3/061 718/105 |
| 2015/0201017 A1* | 7/2015 | Hrischuk ............ | H04L 67/1097 709/226 |

* cited by examiner

*Primary Examiner* — Hamza Algibhah
(74) *Attorney, Agent, or Firm* — Haynes and Boone, LLP

(57) ABSTRACT

A system and method for determining I/O performance headroom that accounts for a real-world workload is provided. In some embodiments, a computing device is provided that is operable to identify a data transaction received by a storage system and directed to a storage device. The computing system identifies an attribute of the data transaction relating to a performance cost of the data transaction and queries a performance profile to determine a benchmark performance level for the storage device. The computing system determines a benchmark performance level for the storage system based on the benchmark performance level for the storage device and compares a metric of the performance of the data transaction with the storage system benchmark performance level to determine remaining headroom of the storage system.

20 Claims, 6 Drawing Sheets

DETERMINING I/O PERFORMANCE HEADROOM

TECHNICAL FIELD

The present description relates to data storage and retrieval and, more specifically, to a technique for comparing system performance load to a realistic performance benchmark that accounts for intricacies of the workload.

BACKGROUND

Networks and distributed storage allow data and storage space to be shared between devices located anywhere a connection is available. These implementations may range from a single machine offering a shared drive over a home network to an enterprise-class cloud storage array with multiple copies of data distributed throughout the world. Larger implementations may incorporate Network Attached Storage (NAS) devices, Storage Area Network (SAN) devices, and other configurations of storage elements and controllers in order to provide data and manage its flow. Improvements in distributed storage have given rise to a cycle where applications demand increasing amounts of data delivered with reduced latency, greater reliability, and greater throughput. Building out a storage architecture to meet these expectations enables the next generation of applications, which is expected to bring even greater demand.

In order to provide storage solutions that meet a customer's needs and budget, it is not sufficient to blindly add hardware. Instead, it is increasingly beneficial to seek out and reduce bottlenecks, limitations in one aspect of a system that prevent other aspects from operating at their full potential. For example, an administrator may desire to know whether adding additional storage devices to a storage system will improve performance or whether moving data sets between devices can deliver the same benefits without adding hardware. An administrator may also want to know how much of a performance impact to expect if another application is hosted on a storage system. As another example, as costs of solid-state devices have come down, administrators are being asked to identify data that should be transitioned from magnetic hard disk drives to solid-state devices in order to maximize performance.

Accordingly, a need exists for improved performance tracking and analysis techniques capable of providing a more accurate assessment of performance under real-world conditions. In particular, systems and methods for comparing storage system performance against realistic performance benchmarks may provide a more comprehensive picture that enables administrators to reduce bottlenecks and to improve data access speeds. Thus, while existing techniques for storage system benchmarking have been generally adequate, the techniques described herein provide improved accuracy and efficiency.

BRIEF DESCRIPTION OF THE DRAWINGS

The present disclosure is best understood from the following detailed description when read with the accompanying figures.

DETAILED DESCRIPTION

Figure 1:
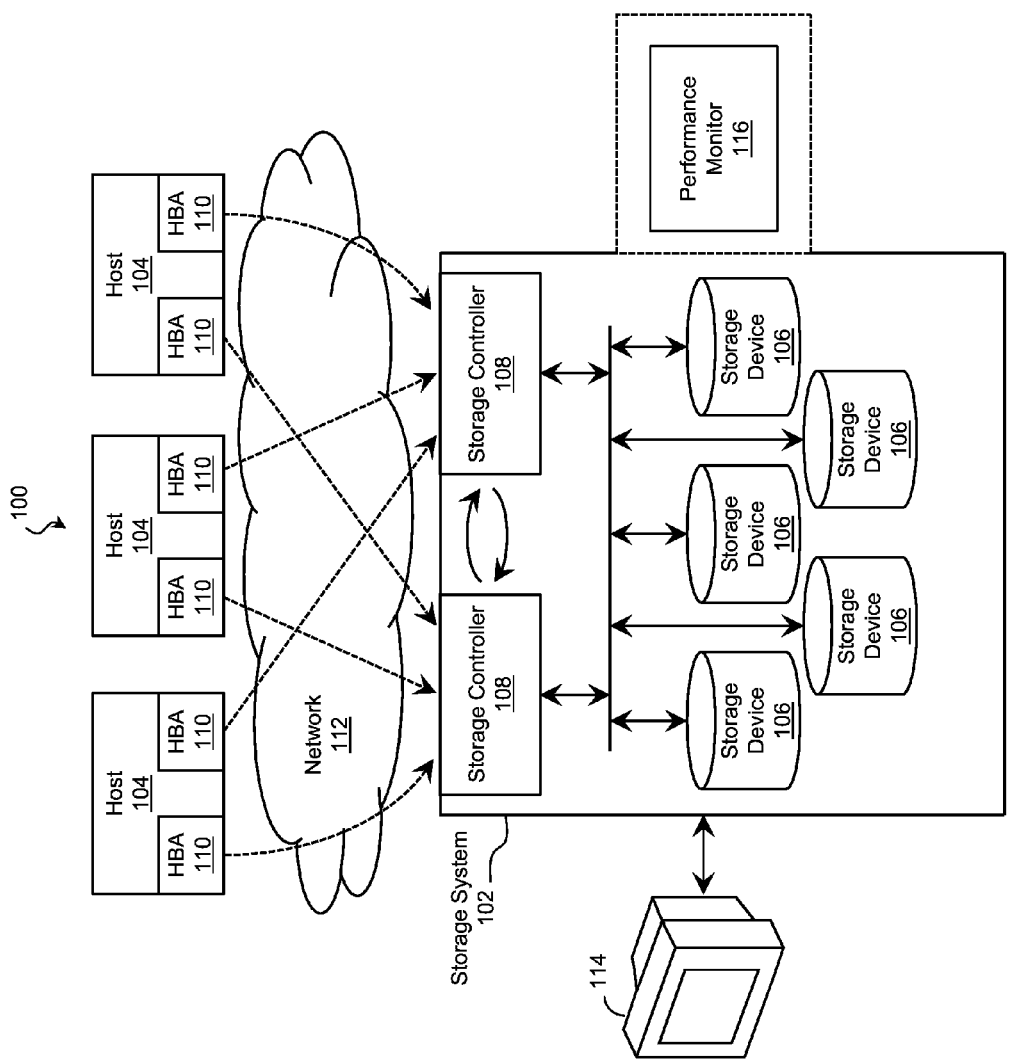
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments include systems and methods for characterizing data transactions by identifying transaction characteristics that indicate the burden on a storage system tasked with the transactions. Any suitable transaction characteristics may be considered including: randomness, queue depth, whether the transaction is a read-or-write, I/O size, seek distance, etc. In some embodiments, the optimal system performance under such a burden is determined using a performance profile database that contains measured performance of various storage components cross-referenced by transaction characteristics. The optimal system performance may be used as a benchmark to compare with the actual performance attained by the storage system. From the comparison, the remaining performance capacity (headroom) of the storage system may be determined and may be presented at a user display. In applications where the data transactions push the computing system to its limits, such information may be used to identify upgrades that would further improve performance. In applications where the computing system has additional performance headroom, such information may be used to quantify the amount of headroom and to identify additional tasks to assign to the system.

Although the scope of embodiments is not limited to any particular use case, in one example, a storage environment includes a storage system and a performance monitor that may or may not be part of the storage system. As the storage system receives and performs data transactions from various attached hosts or from applications running on the storage system, the performance monitor identifies one or more transactions attributes relating to the performance cost or burden of the current workload. The performance monitor queries a performance profile based on the transaction attributes to determine benchmark performance metrics for the storage devices and/or other elements. The performance monitor may then compare the performance of the storage system to the benchmark. Because the performance benchmark is responsive to the type of transactions currently being executed by the storage system, it provides a more accurate indication of how much performance could be wrung from the storage system if the current workload scaled than most conventional techniques can provide. This may enable administrators to better utilize current resources and to better plan system expansion. It is understood that these features and advantages are shared among the various examples herein and that no one feature or advantage is required for any particular embodiment.

FIG. 1 is a schematic diagram of an exemplary storage architecture 100 according to aspects of the present disclosure. The storage architecture 100 includes a number of storage systems 102 in communication with a number of hosts 104. The storage systems 102 are merely one example of a type of computing system that may be used in conjunction with the systems and methods of the present disclosure. The storage systems 102 receive data transactions (e.g., requests to read and/or write data) from the hosts 104, and take an action such as reading, writing, or otherwise accessing the requested data. For many exemplary transactions, the storage systems 102 return a response such as requested data and/or a status indictor to the respective host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to hosts' data transactions so that the storage devices 106 appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, it is also common for the storage system 102 to include a heterogeneous set of storage devices 106 that includes storage devices of different media types from different manufacturers with notably different performance.

The storage system 102 may group the storage devices 106 for speed and/or redundancy using a virtualization technique such as RAID (Redundant Array of Independent/Inexpensive Disks). The storage system may also arrange the storage devices 106 hierarchically for improved performance by including a large pool of relatively slow storage devices and one or more caches (i.e., smaller memory pools typically utilizing faster storage media). Portions of the address space are mapped to the cache so that transactions directed to mapped addresses can be serviced using the cache. Accordingly, the larger and slower memory pool is accessed less frequently and in the background. In an embodiment, a storage device includes HDDs, while an associated cache includes SSDs.

The storage system 102 also includes one or more storage controllers 108 in communication with the storage devices 106 and any respective caches. The storage controllers 108 exercise low-level control over the storage devices in order to execute (perform) data transactions on behalf of the hosts 104. The storage system 102 may also be communicatively coupled to a user display 114 for displaying diagnostic information, application output, and/or other suitable data.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108 of the storage system 102. The HBA 110 provides an interface for communicating with the storage controller 108, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. The HBAs 110 of the hosts 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, or the like. In many embodiments, a host 104 has multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., read, write, modify, etc.) remote data, a host HBA 110 sends one or more data transactions to the respective storage system 102. Data transactions are requests to read, write, or otherwise access data stored within a data storage device such as the storage system 102, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information. The storage system 102 executes the data transactions on behalf of the hosts 104 by reading, writing, or otherwise accessing data on the storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

In order to assess system performance and determine how quickly data transactions are being satisfied, a number of metrics may be tracked as a storage system 102 responds to real-world or synthetic data transactions. Accordingly, the storage environment 100 includes a performance monitor 116, which may or may not be part of the storage system 102 executing the transactions. In embodiments in which the performance monitor 116 is a separate computing system, similar to the storage system 102, while the performance monitor 116 is referred to as a single entity, it may include any number of computing devices and/or computing systems in communication with the storage system(s) 102 to be monitored. By offloading some of the burden of performance tracking and analysis to a separate performance monitor 116, the resources of the storage system 102 can be dedicated to servicing the data transactions.

Taken alone, the raw performance metrics may not necessarily provide sufficient context to assess whether a storage system 102 is operating at its peak. It has been determined through experimentation and analysis that certain attributes of data transactions may dramatically affect the peak performance a storage system 102 can attain. For example, some transactions, by their nature, simply have a greater burden or execution cost than others. Accordingly, some of the techniques of the present disclosure use various attributes of the data transactions to determine the workload burden and, accordingly, the maximum performance that can be obtained from the storage system 102 in light of the current environment. This gives a more realistic assessment of the storage system 102 and may give an administrator a greater insight into how much headroom (additional capacity) remains, where hardware can be added to improve performance, whether to rebalance hosts 104 or applications, and whether to take other corrective actions.

Figure 2:
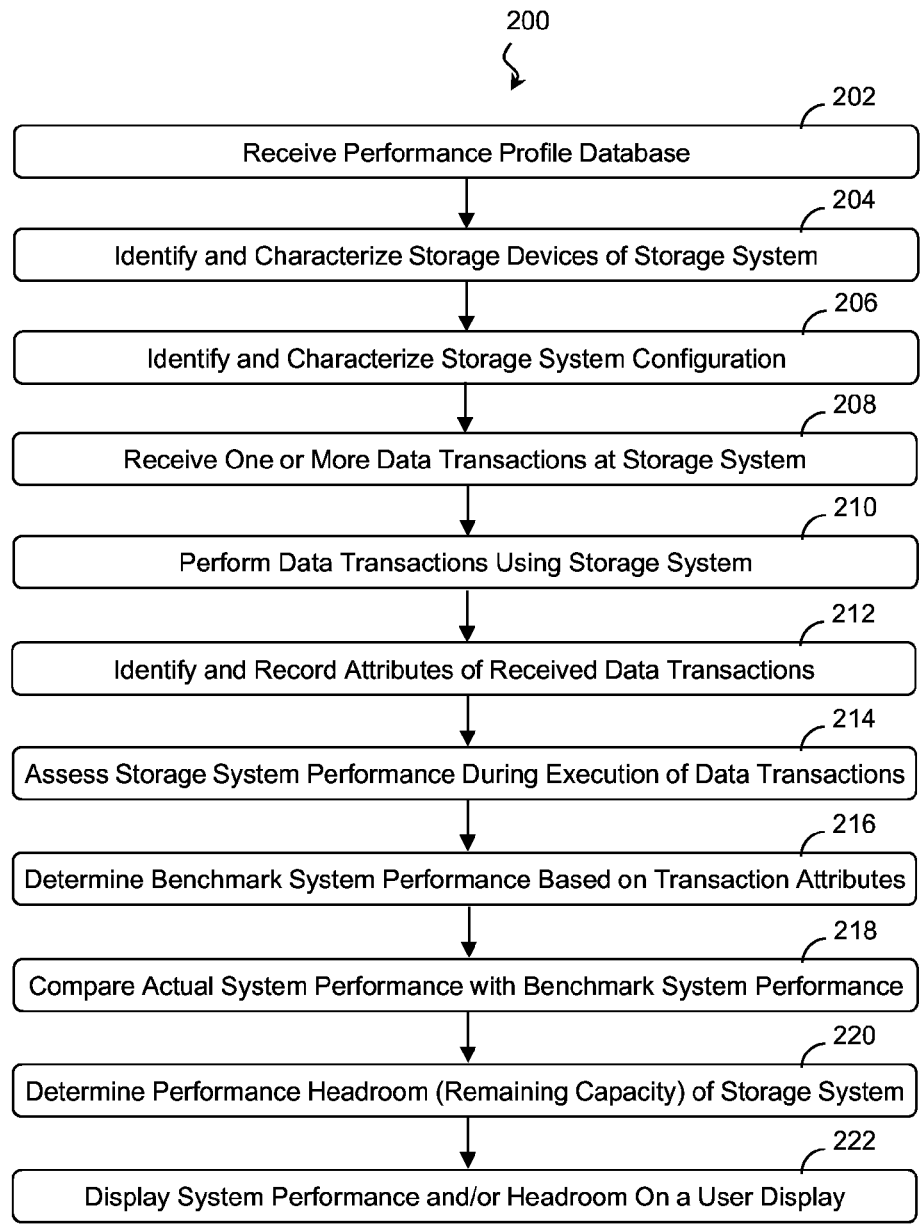
FIG. 2 is a flow diagram of a method of determining storage system performance and headroom according to aspects of the present disclosure.
Figure 3:
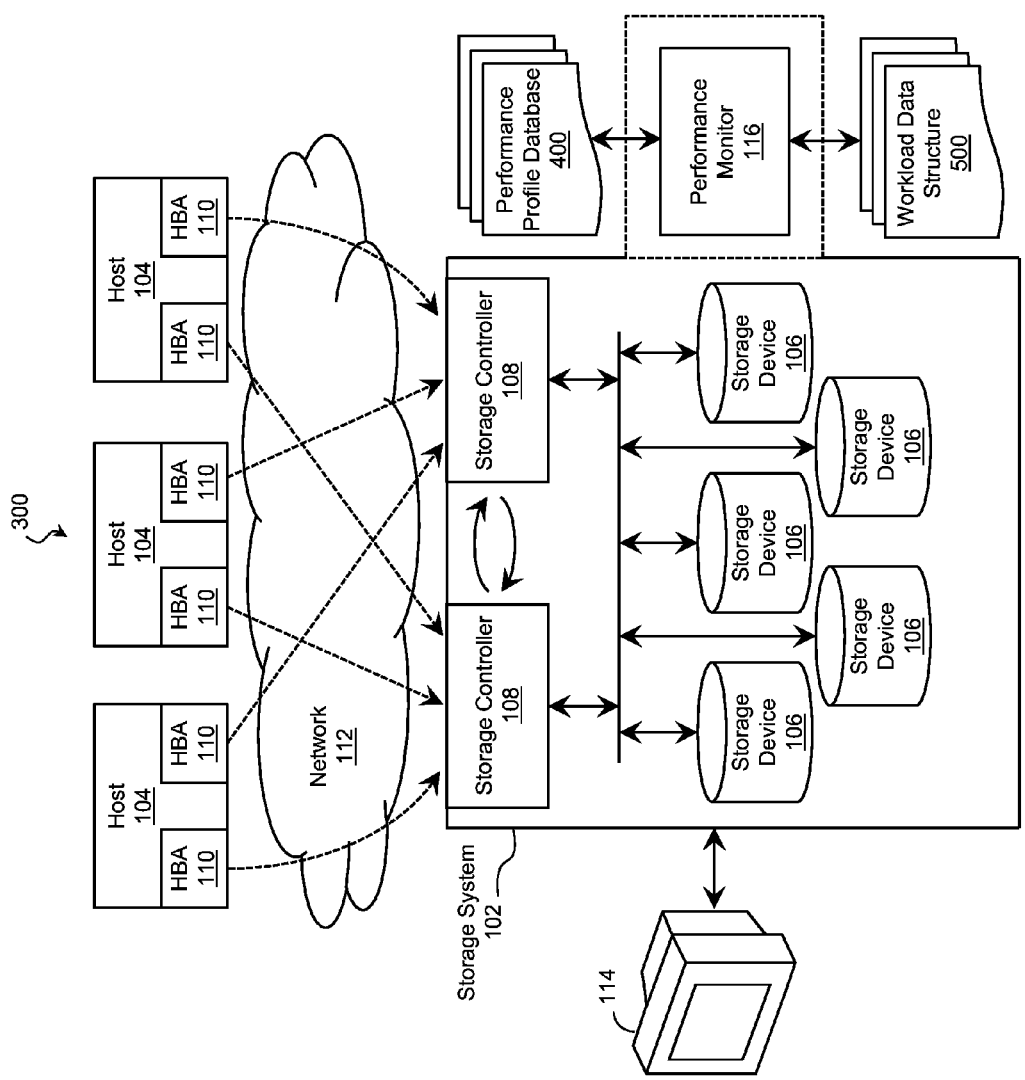
FIG. 3 is a schematic diagram of an exemplary storage architecture operable to perform the method of determining system headroom according to aspects of the present disclosure.
Figure 4:
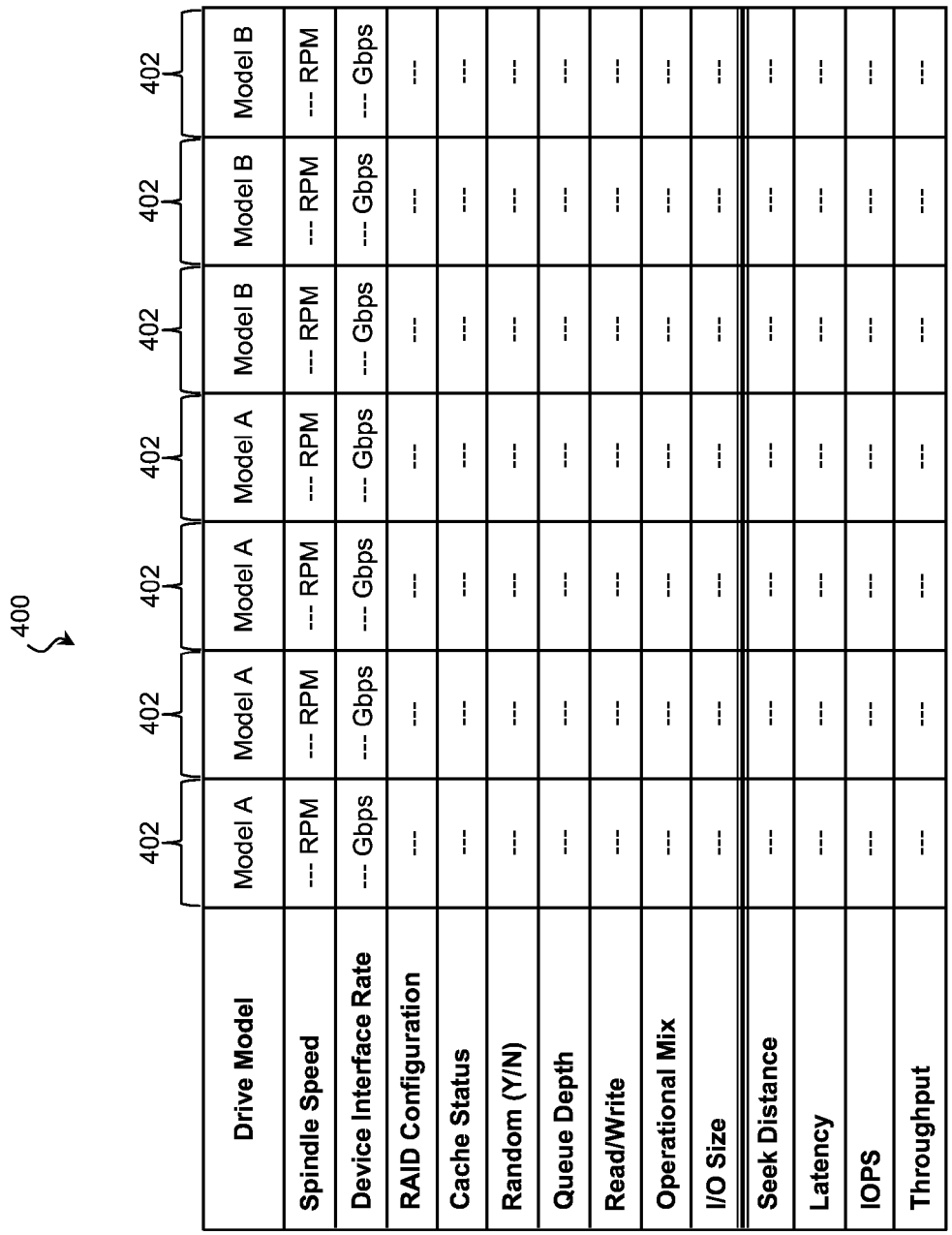
FIG. 4 is a memory diagram of a performance profile database according to aspects of the present disclosure.
Figure 5:
FIG. 5 is a memory diagram of a workload data structure according to aspects of the present disclosure.
Figure 6:
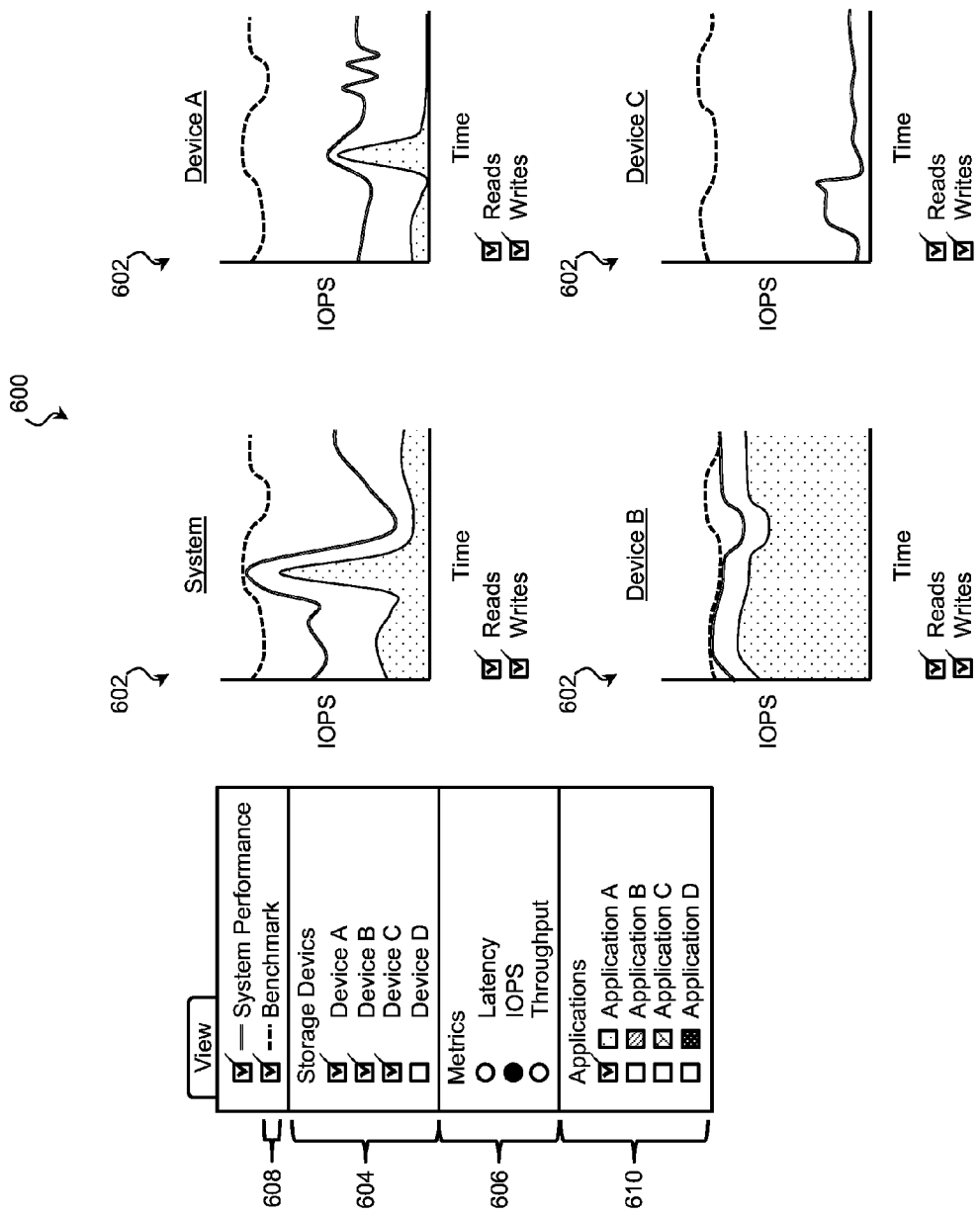
FIG. 6 is representational diagram of an exemplary user-interface according to aspects of the present disclosure.

Some such techniques for storage system performance analysis are described with reference to FIGS. 2-6. FIG. 2 is a flow diagram of the method 200 of determining storage system headroom according to aspects of the present disclosure. It is understood that additional steps can be provided before, during, and after the steps of method 200, and that some of the steps described can be replaced or eliminated for other embodiments of the method. FIG. 3 is a schematic diagram of an exemplary storage architecture 300 operable to perform the method of determining system headroom according to aspects of the present disclosure. The storage architecture 300 of FIG. 3 may be substantially similar to that of FIG. 1, and in that regard, may include one or more hosts 104, a storage system 102, and a performance monitor 116, each substantially similar to those of the storage architecture 100 of FIG. 1. FIG. 4 is a memory diagram of a performance profile database 400 according to aspects of the present disclosure. FIG. 5 is a memory diagram of a workload data structure 500 according to aspects of the present disclosure. FIG. 6 is representational diagram of an exemplary user-interface 600 according to aspects of the present disclosure.

Referring to block 202 of FIG. 2 and to FIGS. 3 and 4, the storage system 102 and/or the performance monitor 116 receives a performance profile database 400. The performance profile database 400 contains records of performance metrics attained by specific hardware, such as specific storage devices 106, under a variety of workloads. By containing device-specific performance values, the performance profile database 400 is particularly well suited for heterogeneous storage systems that incorporate a wide range of storage device types and manufacturers. In the steps that follow, a peak performance for the storage system 102 is determined based on its components and its actual workload. Because the performance profile database 400 accounts for transaction characteristics that affect storage system 102 performance as well as the unique configuration of the system, a more accurate performance baseline can be determined. To this end, the performance profile database 400 may record any suitable performance metrics and may correlate the metrics to any suitable device, system, and/or transaction characteristic.

As an example, in various embodiments, the performance metrics of the database 400 include average latency, peak latency, average TOPS (I/O operations per second), peak IOPS, data throughput and/or other performance metrics. The performance metrics are correlated to characteristics that account for various data transaction attributes, device attributes, and/or system attributes determined to have an effect on performance. Such characteristics may be selected because they represent the cost (i.e., the burden) of completing the transactions. In an example, the transaction characteristics include a measurement of address randomness, and the performance profile database 400 has a first performance metric value for a data transaction that is part of a sequential set of transactions (directed to adjacent or nearby memory addresses) and a second performance metric value for a data transaction that is part of a random set of transactions (directed to non-adjacent memory addresses). In some examples, the transaction characteristics include transaction seek distance, and the performance profile database 400 records a range of performance values corresponding to a range transaction seek distances. A seek distance for a transaction directed to a hard disk drive-type storage device 106 may account for both the distance an actuator moves a read/write head and the distance a platter rotates in order to align the read/write head with the data. In some examples, the transaction characteristics include the ratio of reads to writes of the last n transactions, sometimes referred to as the operational mix. In further examples, the device, system, and transaction characteristics of the performance profile database 400 include queue depth (e.g., a depth of a storage controller queue) at the time the data transaction is performed, I/O size, spindle speed, power saving mode, interface data type, interface data protocol, interface data rate, cache status, and/or other suitable attributes.

An exemplary performance profile database 400 is illustrated in FIG. 4, and despite being referred to as a database, may be maintained in any suitable representation including a linked list, a tree, a table such as a hash table, an associative array, a state table, a flat file, a relational database, and/or other memory structure. In the illustrated embodiment, an entry 402 of the performance profile database 400 records a number of device, system, and workload characteristics including: a drive model, a spindle speed, an interface data rate, a RAID configuration, a cache status, a sequential/random address indication, queue depth, read/write indication, operational mix, IO size, and/or a seek distance. The entry 402 also includes a number of performance metrics associated with the device, system, and/or workload characteristics such as latency, IOPS, and/or throughput. The performance profile database 400 contains a number of such entries 402 and in this way, provides an accurate representation of device performance in a variety of different conditions.

Referring to block 204 of FIG. 2, the storage system 102 and/or the performance monitor 116 identifies and characterizes the storage devices 106 of the storage system 102. This may include determining the manufacturer, model, capacity, storage medium type, cache type, cache amount, spindle speed, supported power-saving modes, interface protocol, interface type, interface speed, and/or other identifying attributes of each storage device 106 of the storage system. This identifying information may be used in conjunction with the performance profile database 400 to determine a peak performance for each storage device 106, and accordingly, the attributes identified in block 204 may correspond to the device, system, and/or transaction characteristics recorded in the received performance profile database 400.

Referring to block 206 of FIG. 2, the storage system 102 and/or the performance monitor 116 identifies and characterizes the storage system 102 to determine configuration aspects that may impact performance. For example, in some embodiments, this includes determining the RAID configuration for each storage device 106. In some embodiments, this includes characterizing a storage controller 108 to which a storage device 106 is attached and/or characterizing a connection between the storage controller 108 and the storage device 106. Other suitable configuration aspects include controller cache size, controller bandwidth, interface protocol, interface type, interface speed, and/or other suitable metrics. Similar to the storage device 106 attributes, the system identified in block 206 may correspond to the device, system, and/or transaction characteristics recorded in the received performance profile database 400.

Referring to block 208 of FIG. 2, the storage system 102 receives one or more data transactions. The data transactions may be received from any source including the hosts 104, applications running on the storage system 102, and/or other sources. The data transactions may be part of a real-world workload and may be received in the course of the regular operation of the storage system 102. The data transactions may also be part of a benchmark such as a synthetic storage benchmark. Referring to block 210 of FIG. 2, the storage system 102 performs the received data transactions using one or more of the storage devices 106. Performing the data transactions may include reading data from the storage devices 106 and writing data to the storage devices 106, as well as providing various responses to the transaction sender (e.g., a host 104 or an application running on the storage system 102).

Referring to block 212 of FIG. 2 and to FIGS. 3 and 5, the storage system 102 and/or the performance monitor 116 also identify and record attributes of the received data transactions using one or more counters of a workload data structure 500. The recorded attributes are used in conjunction with the performance profile database 400 to evaluate the performance of the storage system 102, and accordingly, any aspect of a data transaction that may affect storage system 102 performance may be recorded. In that regard, some relevant transaction attributes or characteristics represent the associated cost or burden on the storage system 102 to execute the transaction. For example, the storage system and/or the performance monitor may identify and record the I/O size (the size of the target data) of a data transaction. In another example, the performance monitor 116 records whether a data transaction is part of a sequential set of transactions or part of a random set of transactions. Additionally or in the alternative, the storage system 102 and/or the performance monitor 116 may record a seek distance for a received data transaction. Other suitable attributes that may be identified include a queue depth (e.g., a depth of a storage controller queue) and/or operational mix at the time the data transaction is performed. Identifying information may also be recorded for each transaction such as a target logical block address (LBA), the host 104 providing the transaction, the application providing the transaction, and/or whether the transaction is a read or a write transaction.

FIG. 5 illustrates some examples of a workload data structure 500 recording attributes of received data transactions. The workload data structure 500 may take any suitable format including a linked list, a tree, a table such as a hash table, an associative array, a state table, a flat file, a relational database, and/or other memory structure. In the illustrated embodiment, the workload data structure 500 contains an entry 502 for each received data transaction that records an identifier, such as a pseudorandom value, uniquely identifying the data transaction. The entry 502 also records various attributes of the received data transaction, which may include some or all of the transaction attributes recorded in the performance profile database 400. In the illustrated embodiment, the entry 502 records the application generating the transactions, LBA position, whether a transaction is part of a sequential sequence or a random sequence, current queue depth, whether a transaction is a read or a write, I/O size, seek distance, and/or other suitable attributes.

Referring to block 214 of FIG. 2, the storage system 102 and/or the performance monitor 116 assesses the storage system's execution of the received data transactions in block 210. As part of the assessment, a set of performance metrics may be determined that quantify the storage system's operation. These performance metrics may be compared to a performance benchmark determined from the performance profile database 400. Accordingly, the performance metrics determined in block 214 may include some or all of the performance metrics recorded in the performance profile database 400. For example, in various embodiments, the storage system 102 and/or performance monitor 116 determines performance metrics including average latency, peak latency, average IOPS (I/O operations per second), peak IOPS, data throughput, and/or other performance metrics.

Referring to block 216 of FIG. 2, the storage system 102 and/or the performance monitor 116 determines a benchmark performance level for the storage system 102 in view of the workload. This may begin by determining a benchmark performance level for one or more components (e.g., storage device 106, storage controller, etc.) of the storage system 102 from the performance profile database 400 and the received data transactions. The component benchmarks represent the optimal performance that could be attained by the respective components given the current workload. From the component benchmark(s), a storage system benchmark may be determined. The storage system benchmark represents the optimal performance that could be attained by the storage system 102 given the current workload. In environments in which the storage system 102 is operating at full capacity, the benchmark performance level may be substantially similar to the current performance. In environments in which the storage system 102 has additional headroom, the benchmark performance level may represent a theoretical performance if the current workload scaled up.

To determine the component benchmarks, the storage system 102 and/or the performance monitor 116 may query the performance profile database 400 based on a combination of the device attributes of block 204, the storage system attributes of block 206, and/or the data transaction attributes of block 212 to determine device-level performance metrics. In such embodiments, the device-level performance metrics are combined in view of the system configuration and other storage system attributes to determine the benchmark performance level for the storage system 102. For example, for independent storage devices 106 in an independent arrangement (e.g., RAID level 0), IOPS and bandwidth of each device may add linearly, while latency may be relatively unaffected. For storage devices 106 in a redundant configuration (e.g., RAID level 1), latency and IOPS for the array may reflect the slowest storage device 106.

Once the storage system benchmark for the workload has been determined, referring to block 218 of FIG. 2, the storage system 102 and/or the performance monitor 116 compares the actual performance determined in block 214 to the system benchmark determined in block 216 to assess how well the storage system 102 is operating under the current workload. The comparison may be used for various diagnostic and predictive purposes including determining whether a current storage system 102 configuration could support additional hosts 104 or applications, determining where to add additional hardware to improve storage system performance, determining how to reallocate applications among storage devices 106, as well as for other purposes. For example, in some applications, an administrator may physically and communicatively couple new storage devices 106 and/or storage controllers 108 to the storage system 102 to relieve load on overburdened components. In some applications, the administrator may physically and communicatively remove storage devices 106 and/or storage controllers 108 from the storage system 102 and reallocate the storage tasks to remaining components. In some applications, the administrator may move a working data set of an application from a busy storage device 106 to one that is less utilized. Because the benchmark performance level accurately reflects the actual workload experienced by the storage system, the present technique provides a better understanding of those components most critical to managing the workload.

To aid in this process, referring to block 220 of FIG. 2 and to FIG. 6, the storage system 102 and/or the performance monitor 116 displays the comparison, the system benchmark, the device benchmarks, the performance metrics, and/or any other suitable information on a user display 114 via a user interface 600. An exemplary user interface 600 is illustrated in FIG. 6, and represents one possible arrangement for displaying results of the comparison and analysis of block 218. One skilled in the art will recognize that alternate arrangements are both contemplated and provided for.

The user interface 600 may include a number of performance panes 602 for displaying performance attributes of elements of the storage system. In the illustrated embodiments, one of the performance panes 602 corresponds to overall storage system performance, while some of the remaining performance panes 602 correspond to performance of individual storage devices 106 of the storage system 102. The user interface 600 may include a storage element selection mechanism 604 operable to receive a user selection of those elements of the storage system 102 to display in a performance pane 602. The user interface 600 may also include a metric selection mechanism 606 operable to receive a user selection of one or more metrics to display. In some embodiments, each performance pane 602 may display a different performance metric or a different set of metrics for the respective device. The selected metric(s) may be displayed using any combination of charts, graphics, and/or text, and in one example, a performance pane 602 displays a measurement of IOPS serviced by the corresponding storage system 102 component over a period of time as determined in block 214.

The user interface may also have a benchmark selection mechanism 608 operable to receive a user selection of whether to display the benchmark performance levels determined in block 216. In the illustrated embodiment, if selected, the benchmark performance level is displayed as an overlay on the actual performance metric determined in block 214.

The user interface 600 may also include one or more workload selection mechanisms 610 operable to receive a user selection specifying what portions of the workload (i.e., what transactions of the workload) to display and/or highlight. In the illustrated embodiment, the workload selection mechanisms 610 allow a user to highlight the portion of the workload produced by a given application.

Suitable selection mechanisms for the storage element selection mechanism 604, the metric selection mechanism 606, the benchmark selection mechanism 608, and/or the workload selection mechanisms 610 include checkboxes, exclusive and non-exclusive lists, radio buttons, and other suitable interface schemes. It is understood that this is merely one example of a suitable user interface 600 and other embodiments utilize other interface configurations.

Embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, one or more processors running in one or more of the hosts 104 and the storage system 102 execute code to implement the actions described above.

Thus, the present disclosure provides a system and method for performance tracking and analysis that accounts for the impact of a workload on a storage system's optimal performance. In some embodiments, a computing device is provided that comprises a memory containing machine readable medium comprising machine executable code having stored thereon instructions for performing a method of performance analysis; and a processor coupled to the memory. The processor configured to execute the machine executable code to identify a data transaction received by a storage system and directed to a storage device. The processor identifies an attribute of the data transaction relating to a performance cost of the data transaction and queries a performance profile based on the identified attribute to determine a benchmark performance level for the storage device. Based on the benchmark performance level for the storage device, the processor is further operable to determine a benchmark performance level for the storage system in performing the data transaction. The computing device is further operable to compare a metric of the performance of the data transaction by the storage system with the benchmark performance level to determine remaining headroom of the storage system. In some embodiments, the attribute of the data transaction includes at least one of: an I/O size of the data transaction or a seek distance of the data transaction. In some such embodiments, the attribute of the data transaction further includes at least one of: a randomness metric, a cache status, a queue depth, or whether the transaction is a read transaction or a write transaction.

In further embodiments, a method is provided that includes receiving a data transaction at a storage system. A characteristic of the data transaction relating to an execution burden of the data transaction is identified. A data structure recording benchmark performance of a storage device of the storage system is received and, using a computer system, a performance benchmark for the storage system in executing the data transaction is determined based on the identified characteristic and the received data structure. An execution of the data transaction by the storage system is assessed to determine a performance metric, and the performance metric is compared to the determined performance benchmark to determine a remaining execution capacity of the storage system. In some such embodiments, the comparing of the performance metric to the determined performance benchmark further determines a remaining execution capacity of the storage device. In some embodiments, the determining of the performance benchmark includes: identifying a redundant array of independent disks (RAID) configuration of the storage device within the storage system, and determining the performance benchmark further based on the RAID configuration of the storage device.

In yet further embodiments, an apparatus is provided comprising a non-transitory machine-readable medium having stored thereon instructions for performing a method of workload assessment. The instructions comprise machine executable code, which when executed by at least one machine, causes the machine to: characterize an execution burden of a data transaction; determine, based on a benchmark performance record and the characterized execution burden, a component benchmark for a component of a storage system performing the data transaction; determine a system benchmark for the storage system in executing the data transaction based on the component benchmark; assess a performance by the storage system of the data transaction to determine a performance metric; and compare the performance metric to the system benchmark to determine a remaining execution capacity of the storage system. In some embodiments, the machine executable code further causes the machine to provide an interface for displaying the remaining execution capacity of the storage system on a user display. In some embodiments, the machine executable code further causes the machine to move a data set from a first storage device to a second storage device based on the remaining execution capacity of the storage system.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computing device comprising:
   a memory containing machine readable medium comprising machine executable code having stored thereon instructions for performing a method of performance analysis; and
   a processor coupled to the memory, the processor configured to execute the machine executable code to:
      identify a data transaction received by a storage system comprising a plurality of first storage devices and directed to a second storage device from the plurality of first storage devices;
      identify an attribute of the data transaction relating to a performance cost of the data transaction;
      query a performance profile based on the identified attribute to determine a benchmark performance level for the second storage device;
      determine a benchmark performance level for the storage system based on the benchmark performance level for the second storage device; and
      compare a metric based on the storage system performing the data transaction to the determined benchmark performance level for the storage system to determine a remaining headroom of the storage system.

2. The computing device of claim 1, wherein the computing device is a separate computing system from the storage system.

3. The computing device of claim 1, wherein the attribute of the data transaction includes at least one of: an I/O size of the data transaction or a seek distance of the data transaction.

4. The computing device of claim 3, wherein the attribute of the data transaction further includes at least one of: a randomness metric, a cache status, a queue depth, or whether the data transaction is a read transaction or a write transaction.

5. The computing device of claim 3, wherein the attribute of the data transaction further includes at least one of: an identifier of a host providing the data transaction or an identifier of an application providing the data transaction.

6. The computing device of claim 1, wherein the processor is further configured to execute the machine executable code to compare the metric of the performance of the data transaction by the storage system with the benchmark performance level to determine a remaining headroom of the second storage device.

7. The computing device of claim 1, wherein the processor is further configured to execute the machine executable code to:
   identify a redundant array of independent disks (RAID) configuration of the second storage device within the storage system, and
   determine the benchmark performance level for the storage system further based on the RAID configuration of the second storage device.

8. The computing device of claim 1, wherein the processor is further configured to execute the machine executable code to present the remaining headroom of the storage system at a user display via a user interface.

9. The computing device of claim 8, wherein the processor is further configured to execute the machine executable code to present at least one of: the metric of the performance of the data transaction, the benchmark performance level for the storage system, or the benchmark performance level for the device at the user display via the user interface.

10. A method comprising:
   receiving, at a storage system comprising a plurality of first storage devices, a data transaction;
   identifying a characteristic of the data transaction relating to an execution burden of the data transaction;
   accessing a data structure recording benchmark performance of a second storage device from the plurality of first storage devices of the storage system;
   determining, using a computing system, a performance benchmark for the second storage device based on the identified characteristic and the accessed data structure;
   determining, using the computing system, a performance benchmark for the storage system based on the performance benchmark for the second storage device;
   assessing an execution of the data transaction by the storage system to determine a performance metric; and
   comparing the performance metric to the determined performance benchmark for the storage system to determine a remaining execution capacity of the storage system.

11. The method of claim 10, wherein the characteristic includes at least one of: an I/O size of the data transaction or a seek distance of the data transaction.

12. The method of claim 10, wherein the comparing of the performance metric to the determined performance benchmark for the storage system further determines a remaining execution capacity of the second storage device.

13. The method of claim 10, wherein the determining of the performance benchmark for the storage system includes:
   identifying a redundant array of independent disks (RAID) configuration of the second storage device within the storage system, and
   determining the performance benchmark for the storage system further based on the RAID configuration of the second storage device.

14. The method of claim 10 further comprising providing an interface for displaying the remaining execution capacity of the storage system on a user display.

15. The method of claim 10 further comprising:
   physically and communicatively coupling at least one additional storage device to the storage system based on the remaining execution capacity of the storage system.

16. A non-transitory machine-readable medium having stored thereon instructions for performing a method comprising machine executable code which when executed by at least one machine, causes the machine to:
   characterize an execution burden of a data transaction;
   determine, based on a benchmark performance record and the characterized execution burden, a component benchmark for a component of a storage system performing the data transaction, the storage system comprising a plurality of components;
   determine a system benchmark for the storage system in executing the data transaction based on the component benchmark;
   assess a performance by the storage system of the data transaction to determine a performance metric; and
   compare the performance metric to the system benchmark to determine a remaining execution capacity of the storage system.

17. The non-transitory machine-readable medium of claim 16, wherein the machine executable code for characterizing the execution burden includes further instructions for determining at least one of: an I/O size of the data transaction or a seek distance of the data transaction.

18. The non-transitory machine-readable medium of claim 16 wherein the machine executable code further causes the machine to:
   identify a redundant array of independent disks (RAID) configuration of a storage device associated with the data transaction, and
   determine the system benchmark further based on the RAID configuration.

19. The non-transitory machine-readable medium of claim 16 wherein the machine executable code further causes the machine to:
   provide an interface for displaying the remaining execution capacity of the storage system on a user display.

20. The non-transitory machine-readable medium of claim 16 wherein the machine executable code further causes the machine to:
   move a data set from a first storage device to a second storage device based on the remaining execution capacity of the storage system.

* * * * *